United States Patent
Frank

[15] 3,670,897
[45] June 20, 1972

[54] DESALINATION OF SEA WATER

[72] Inventor: Bruce S. Frank, 7057 North Fairchild Circle, Milwaukee, Wis. 53217

[22] Filed: March 20, 1970

[21] Appl. No.: 21,301

[52] U.S. Cl. .................................................. 210/321, 210/22
[51] Int. Cl. ................................... B01d 31/00, B01d 13/00
[58] Field of Search ............................................ 210/22, 321

[56] References Cited

UNITED STATES PATENTS

| | | | |
|---|---|---|---|
| 3,532,621 | 10/1970 | Hough | 210/22 |
| 3,130,156 | 4/1964 | Neff | 210/22 X |
| 3,357,917 | 12/1967 | Humphreys | 210/22 |

*Primary Examiner*—Frank A. Spear, Jr.
*Attorney*—Smythe & Moore

[57] ABSTRACT

Desalination of sea water is accomplished by use of osmosis wherein there is a saline water chamber and a chamber having a concentrated solution of an intermediate or precipitable soluble salt, such as aluminum sulfate, the chambers being separated by a semipermeable membrane. Fresh water will pass from the saline or sea water to the salt solution without use of pressure. The excess concentrated salt solution in the second chamber passes to a third chamber or place where salt is removed by being brought into contact with a precipitant such as calcium hydroxide in the case of aluminum sulfate.

4 Claims, 1 Drawing Figure

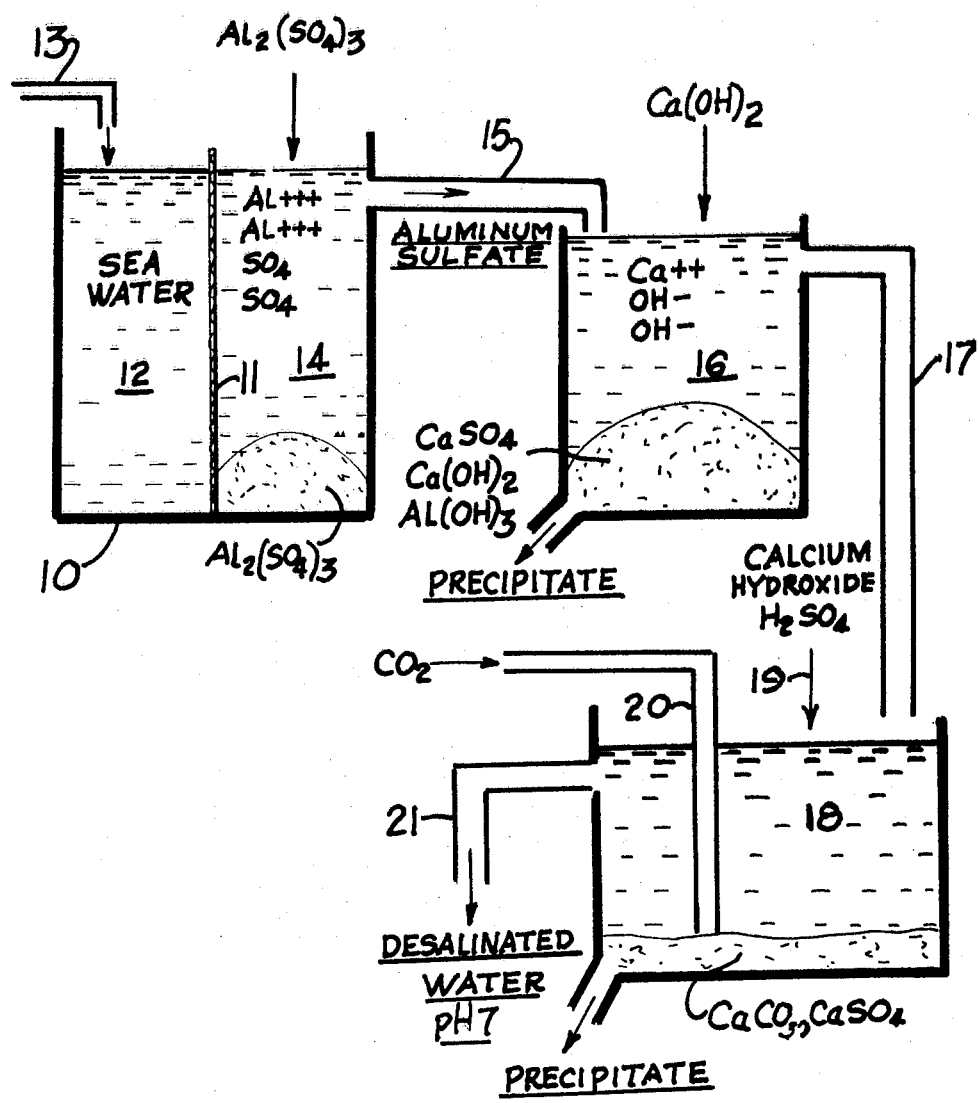

DESALINATION OF SEA WATER

This invention relates to desalination of sea water.

Current desalination systems usually depend upon phase transformation or pressurization which are expensive processes. The reverse osmosis process requires pressures as high as 100 atmospheres to obtain flow.

One of the objects of the invention is to provide an improved and more economical process and apparatus for desalination of water.

In one aspect of the invention, an osmosis system is used wherein the sea water to be desalinated is on one side of a semipermeable diaphragm of the kind usable in reverse osmosis processes, such as cellulose acetate. On the other side of the diaphragm, there is a concentrated solution of chemically precipitable soluble salt such as aluminum sulfate, such having a higher concentration of salt than the concentration of salt in the sea water so that water diffuses to the concentrated solution by forward osmosis. Water will pass through the membrane into the concentrated solution of salt without pressure. As the second or intermediate chamber has water passing thereto from the sea water, the excess is removed and subjected to chemical precipitating agent or agents, such as calcium hydroxide, which will precipitate sulfate to remove the intermediate salt. The water effluent from the precipitation zone which may still contain calcium hydroxide can have the remaining calcium hydroxide removed. Other salts and precipitants can be used as described hereafter.

These and other objects, advantages and features of the present invention will become apparent from the accompanying description and drawings, which are merely exemplary.

In the drawings:

The FIGURE shows a schematic flow diagram.

Referring to the drawings, holding means 10 has semipermeable membrane 11 separating the holding means into a first chamber or holder 12 into which sea water or water to be desalinated is fed by any suitable means, such as pipe 13.

The semipermeable membrane may be of any suitable type such as used in reverse osmosis purposes. One such membrane was one made from a mixture of acetone, water, magnesium perchlorate and cellulose acetate. The casting of the sheet was done at 0° Celsius (±3°). After casting and allowing to wash for one day, the membranes were heat treated to 80.5° Celsius to give the membrane a salt rejection factor of 97 per cent. The membrane was:

| Chemical | Weight % |
|---|---|
| $Mg(ClO_4)_2$ | 1.1 |
| $H_2O$ | 10.0 |
| $CH_3COCH_3$ | 66.7 |
| Cellulose Acetate | 22.2 |

Another membrane that has been used is that designated as Eastman cellulose acetate membrane, Type RO–97, made by Eastman Chemical Products, Inc., which has a salt rejection factor of 97 per cent. Another example of a membrane is shown in U.S. Pat. No. 3,133,132.

The second chamber or holder 14 has a solution containing chemically precipitable soluble salt therein, such solution having a concentration in excess of the solubility of the salt or salts. The concentration of the salt in the second or intermediate chamber is made greater than the concentration of salt in the sea water.

As one example and as illustrated in the drawing, aluminum sulfate ($Al_2(SO_4)_3$) is used as an intermediate salt. The process can be carried out at a temperature of about 20° Celsius. The sea water chamber should be kept full. Then as water passes through the membrane from the sea water holder to the fresh water holder, the excess solution is removed in any suitable manner, such as through conduit 15 to a chamber or holder 16.

In the illustrated example of the intermediate salt being aluminum sulfate, calcium hydroxide in excess of the solubility of calcium hydroxide is used as the precipitant to precipitate almost all of the aluminum ions as aluminum hydroxide ($Al(OH)_3$) and the sulfate ions as calcium sulfate ($Ca(OH)_2$). The water, if desired, then can be further purified by passing it from chamber 16 through conduit 17 to a further chamber or treatment tank 18 where sulfuric acid can be added through pipe 19 or carbon dioxide bubbled through the water through pipe 20 to adjust the pH to 7.

The desalinated water then can be withdrawn through pipe 21, the water having a very low salt content.

It is possible to bring the precipitant into contact with the salt solution from chamber 14 other than by feeding to a tank and similarly in the further treatment by sulfuric acid or carbon dioxide.

As a further example, the excess solution from holder 14 could be centrifuged to remove undissolved salts. The solution from holder 16 also could be centrifuged to remove precipitates and excess calcium hydroxide.

Merely as an example, and using a synthetic sea water placed in one chamber and intermediate of aluminum sulfate solution in the other, water diffused through the membrane into the aluminum sulfate solution causes an increase in the amount of aluminum sulfate solution. The excess aluminum sulfate solution was taken off and treated with an excess of calcium hydroxide, precipitating off the aluminum and sulfate ions. The remaining solution was centrifuged and divided into five 1.00 ml samples and treated with various amounts of sulfuric acid to remove the remaining calcium hydroxide. 0.02 M. $H_2SO_4$ was used. The samples were treated with 0.20 ml, 0.40 ml, 0.60 ml, 0.80 ml, and 1.00 ml of the sulfuric acid solution and were centrifuged again. The remaining solutions were evaporated to determine the final salt content. The numerical results are as follows:

| Sample | Sulfuric Acid ml of 0.020M. | pH | Weight of Beaker | Weight of Beaker and Salt |
|---|---|---|---|---|
| 1 | 0.20 | 11 | 50.4469 | 50.4649 |
| 2 | 0.40 | 11 | 50.9224 | 50.9406 |
| 3 | 0.60 | 10 | 50.4347 | 50.4524 |
| 4 | 0.80 | 8 | 50.7170 | 50.7347 |
| 5 | 1.00 | 6 | 51.8984 | 51.9188 |

| Sample | Weight of Salt | Concentration Grams/Liter | Salt Reduction Factor |
|---|---|---|---|
| 1 | 0.0180 | 18.0 | 47.8% |
| 2 | 0.0182 | 18.2 | 47.2% |
| 3 | 0.0177 | 17.7 | 48.6% |
| 4 | 0.0177 | 17.7 | 48.6% |
| 5 | 0.0204 | 20.4 | 40.8% |

The sea water was made to contain the following concentrations of ions:

| Cation | Concentration P.P.M. | Anion | Concentration P.P.M. |
|---|---|---|---|
| $Na+$ | 10,561 | $Cl-$ | 18,980 |
| $Mg++$ | 1,272 | $SO_4--$ | 2,649 |
| $Ca++$ | 400 | $HCO_3-$ | 142 |
| $K+$ | 380 | $Br-$ | 65 |

Total anions and cations 34,449.

This solution was obtained by using:

| Chemical | Weight (in grams) |
|---|---|
| KCl | 725. |
| $CaCl_2$ | 755. |
| $MgCl_2$ | 3120. |
| NaCl | 23300. |
| $Na_2SO_4$ | 3290. |
| $NaHCO_3$ | 197. |

| | |
|---|---|
| NaBr | 84. |
| H$_2$O | 965517. |

Other precipitable soluble salts can be used in the intermediate salt solution such as magnesium sulfate or magnanese sulfate with the precipitant in the third tank as barium oxide (BaO) and barium silicate (BaSiO$_3$), respectively.

It was found that sea water could be desalinated by chemical-osmotic processes using a salt such as aluminum sulfate as the intermediate salt and a precipitant such as calcium hydroxide as a processing chemical treatment described herein. Almost all of the aluminum sulfate and calcium hydroxide were removed from the final product. Compared to the product of a comparable high pressure reverse osmosis system, the product from the present chemical-osmotic system is almost identical in salt content, but the chemical-osmotic system operates without the expensive high pressures required by a standard reverse osmosis. In addition to the low pressures of the chemical osmotic unit, the low pH of the intermediate salt also increases membrane life as compared to the life in a neutral pH high pressure system.

It should be apparent that details and construction and variations in the process can be made without departing from the spirit of the invention except as set forth in the appended claims.

What is claimed is:

1. In an osmosis water desalination apparatus, the combination including liquid holding means having a semipermeable membrane therein separating said holding means into a first and second portion, means to supply water to be desalinated to said first portion, an intermediate solution of chemically precipitable soluble salt in said second portion, said salt adjusting the pH value of said second portion by decreasing the same to increase membrane life, water diffusing from said first portion into said second portion, means feeding said solution of said second portion to another holding means, means feeding a precipitant for said soluble salt into contact with the solution in said other holding means, means feeding the liquid in said other holding means to another zone, means feeding pH adjusting agent means into contact therewith in said another zone to bring the pH to approximately 7 or less to complete the precipitation of the remaining salts, and means to remove precipitate from said another zone.

2. An apparatus as claimed in claim 1 wherein the adjusting agent includes carbon dioxide.

3. An apparatus as claimed in claim 1 wherein the chemically precipitable soluble salt is selected from the group consisting of aluminum sulfate, magnesium sulfate and manganese sulfate.

4. An apparatus as claimed in claim 3, wherein the precipitant is calcium hydroxide.

* * * * *